(12) United States Patent
Zhang et al.

(10) Patent No.: US 9,676,945 B2
(45) Date of Patent: Jun. 13, 2017

(54) PRIMER FOR METAL SURFACES AND PREPARATION METHOD THEREOF

(71) Applicant: SHANGHAI GORO CONVEYOR SYSTEM COMPONENTS CO., LTD., Shanghai (CN)

(72) Inventors: Lingling Zhang, Shanghai (CN); Jingen Zhou, Shanghai (CN)

(73) Assignee: SHANGHAI GORO CONVEYOR SYSTEM COMPONENTS CO., LTD., Shanghai (CN)

(*) Notice: Subject to any disclaimer, the term of this patent is extended or adjusted under 35 U.S.C. 154(b) by 0 days.

(21) Appl. No.: 15/029,915

(22) PCT Filed: Dec. 13, 2013

(86) PCT No.: PCT/CN2013/089413
§ 371 (c)(1),
(2) Date: Apr. 15, 2016

(87) PCT Pub. No.: WO2015/085590
PCT Pub. Date: Jun. 18, 2015

(65) Prior Publication Data
US 2016/0280928 A1    Sep. 29, 2016

(51) Int. Cl.
| C08K 5/00 | (2006.01) |
| C09D 5/00 | (2006.01) |
| C09D 161/06 | (2006.01) |
| C09D 7/00 | (2006.01) |
| C09D 7/12 | (2006.01) |
| C09D 161/14 | (2006.01) |
| C08K 3/22 | (2006.01) |

(52) U.S. Cl.
CPC .............. *C09D 5/002* (2013.01); *C09D 7/001* (2013.01); *C09D 7/1216* (2013.01); *C09D 161/06* (2013.01); *C09D 161/14* (2013.01); *C08K 2003/2241* (2013.01); *C08K 2003/2296* (2013.01); *C08K 2201/014* (2013.01)

(58) Field of Classification Search
CPC ...... C09D 5/002; C09D 161/14; C09D 7/001; C09D 7/1216
USPC ........................................................ 524/364
See application file for complete search history.

(56) References Cited

U.S. PATENT DOCUMENTS

| 4,769,413 A * | 9/1988 | Fleming ............... C09D 161/06 524/507 |
| 2004/0224168 A1 | 11/2004 | Jennings et al. |
| 2006/0128855 A1 * | 6/2006 | Wang ..................... B32B 15/04 524/262 |

FOREIGN PATENT DOCUMENTS

JP    2001354912 A    12/2001

OTHER PUBLICATIONS

International Search Report for PCT/CN2013/089413, Sep. 17, 2014, 4 pages.

* cited by examiner

*Primary Examiner* — Hui Chin
(74) *Attorney, Agent, or Firm* — Armstrong Teasdale LLP

(57) ABSTRACT

Provided is a primer for metal surfaces and the preparation method thereof. The primer comprises 50-80 wt % of organic solvent (A), 2-15 wt % of phenolic resin (B), 1-10 wt % of rubber elastomer (C), 1-10 wt % of silane coupling agent (D), 5-25 wt % of metal oxide powder (E), and 1-10 wt % of inorganic filler (F); wherein the organic solvent (A) is an organic solvent capable of dissolving the phenolic resin (B) and the rubber elastomer (C), and the inorganic filler (F) is different from the metal oxide powder (E). The primer can facilitate the bonding of metal and rubber, and has high adhesion strength.

13 Claims, No Drawings

PRIMER FOR METAL SURFACES AND PREPARATION METHOD THEREOF

The application is the national stage entry of PCT/CN2013/089413 which was filed on Dec. 13, 2013; the entire contents of which are fully incorporated herein by reference.

TECHNICAL FIELD

The present invention relates to a surface treating agent and a preparation method thereof, and particularly to a primer for metal surfaces which is used for bonding metal and rubber under a normal temperature and a normal pressure, as well as a preparation method of the primer.

BACKGROUND OF THE INVENTION

A metal-rubber bonding system has both the high strength from the metal and the high elasticity from the rubber, and thus is used widely in various fields such as construction, ships, automobiles, aeroengines, oil-seals, conveyer belts, electrical wires, vibration absorbers and the like. At present, the metal-rubber bonding system is usually produced by the vulcanization bonding method. In particular, a metal is firstly surface-treated and then is coated in order with a primer and an adhesive, subsequently a compounded rubber sheet is placed face-to-face on the metal and then vulcanized under heating and pressing to achieve the bonding of the rubber and the metal. For example, for the vulcanization of a pulley lagging, the temperature may be 140-160° C. and the pressure may be 6-10 kg/cm$^2$. The primers used in the vulcanization processes have been commercialized, in which the products (Chemlok®) from LORD Corporation are are the most extensively used.

The metal-rubber bonding system (for example, a pulley lagging) is typically useful for the pulleys in belt conveyers. However, when a belt conveyer is operated in a pit, the pulley lagging is often corroded by smuts and coal slimes, and the rubber layer on the pulley starts to wear away or break up due to suffering from continuously scraping of the conveyer belt buckles. Thus, the service time of the pulley is shortened as the pulley needs to be repaired. Further, the complexity of the vulcanization process makes it impossible to repair the pulley on-site. As a result, the pulleys with seriously-damaged rubber layers have to be sent to special plants for the vulcanization and rubber lagging again, which adversely affects the normal production. In addition, for a driving pulley, in order to protect the bearings during the vulcanization process and meet the clamping requirements on the pulley surface, it is necessary to disassemble undamaged couplings, bearing blocks and bearings on both ends from the driving pulley.

However, as for a driving pulley in an extra-heavy-duty belt conveyer, it is difficult in both installing by interference fit and disassembling of the couplings and bearings because of their large sizes. Moreover, the couplings and bearings are very likely to be damaged during disassembling.

Thus, there is an urgent need of an on-site process for replacing and repairing pulley laggings to shorten operation periods and cut costs. It is also desirable for such process to be carried out at a normal temperature and a normal pressure. However, the existing adhesives do not meet such requirements due to the relatively low adhesive strength at a normal temperature. For example, LDJ-245 Adhesive for rubber lagging produced by Yichang Huangshide Bond Development Co., Ltd. has a 180 degree peel strength of only 2.2 N/mm (determined according to GB/T2791-1995 and the metal material is carbon steel); and LDJ-248, a novel metal-rubber adhesive also produced by Yichang Huangshide (used together with a metal surface treating agent) has a 180 degree peel strength of 4.8 N/mm. For another example, TS853 rubber-metal adhesive which is commercially available from TONSAN Adhesive Inc., used together with 1753 primer, has a 180 degree peel strength of only 3.5 N/mm.

Consequently, there exists an urgent need of a primer for metal surfaces which can be used for bonding metal and rubber under a normal temperature and a normal pressure, and exhibits high peel strength. Such primer can meet the requirements of on-site rubber lagging on pulleys of belt conveyers.

SUMMARY OF THE INVENTION

One object of the invention is to provide a primer, especially a primer for metal surfaces which is used for bonding the metal and rubber under a normal temperature and a normal pressure. Such primer can provide a superior bonding between metal and rubber under a normal temperature and a normal pressure when it is used in combination with an adhesive, and thereby achieves high bonding efficiency and high adhesion strength between the metal and vulcanized rubber.

Another object of the invention is to provide a method for preparing a primer, especially a primer used for metal surfaces. The method is simple and the product produced by such method has a stable quality.

In the first aspect of the present invention, a primer for metal surfaces is provided. The primer comprises:
organic solvent (A) 50-80 wt %;
phenolic resin (B) 2-15 wt %;
rubber elastomer (C) 1-10 wt %;
silane coupling agent (D) 1-10 wt %;
metal oxide powder (E) 5-25 wt %; and
inorganic filler (F) 1-10 wt %,
wherein the organic solvent (A) is an organic solvent capable of dissolving the phenolic resin (B) and the rubber elastomer (C), and the inorganic filler (F) is different from the metal oxide powder (E).

In one preferred embodiment of the present invention, the primer may not contain any curative or catalyst.

In one preferred embodiment of the present invention, the phenolic resin (B) may be selected from resole, linear phenolic resin, p-t-butylphenol formaldehyde resin, xylene modified phenolic resin, polyvinyl acetal modified phenolic resin, rubber modified phenolic resin, epoxide modified phenolic resin, polyamide modified phenolic resin and any mixtures thereof.

In one preferred embodiment of the present invention, the rubber elastomer (C) may be selected from nitrite butadiene rubber, chlorinated natural rubber, chlorinated polybutadiene, chloro-sulfonated polyethylene, chlorinated polyethylene, polychloroprene and any mixtures thereof.

In one preferred embodiment of the present invention, the silane coupling agent (D) may be selected from vinyl-containing siloxane, amino-containing siloxane, epoxy group-containing siloxane, acyl-containing siloxane, mercapto group-containing siloxane, phenyl-containing siloxane and any mixtures thereof.

In one preferred embodiment of the present invention, the metal oxide powder (E) may be selected from magnesium oxide, zinc oxide, titanium dioxide and any mixtures thereof.

In a further preferred embodiment of the present invention, the metal oxide powder (E) may be a mixture of zinc oxide and titanium dioxide.

In an embodiment of the present invention, preferably in the mixture of zinc oxide and titanium dioxide, the weight ratio of zinc oxide to titanium dioxide may be 10-20:2-6.

In one preferred embodiment of the present invention, the inorganic filler (F) may be selected from silica, calcium carbonate, carbon black and any mixtures thereof.

In one preferred embodiment of the present invention, the organic solvent (A) may be selected from acetone, butanone, methyl isobutyl ketone, cyclohexanone, toluene, xylene, ethylbenzene and any mixtures thereof.

In a further preferred embodiment of the present invention, the organic solvent (A) may be a mixture of methyl isobutyl ketone and xylene.

In an embodiment of the present invention, preferably in the mixture of methyl isobutyl ketone and xylene, the weight ratio of methyl isobutyl ketone to xylene may be 40-60:6-15.

In one preferred embodiment of the present invention, the primer has a 180 degree peel strength of 8-10 N/mm determined according to GB/T2790-1995.

In a second aspect of the present invention, a method for preparing a primer for metal surfaces is provided. The method comprises the steps of:

a. providing raw materials according to the above formulation of the primer of the invention;

b. dissolving the phenolic resin (B) and the rubber elastomer (C) into the organic solvent (A) to form a mixed solution;

c. mixing the silane coupling agent (D) with the mixed solution to form a stable solution;

d. mixing the metal oxide powder (E) and the inorganic filler (F) with the stable solution to form a mixed slurry;

e. grinding the mixed slurry.

In one preferred embodiment of the present invention, the method comprises the particular steps of:

a. providing raw materials according to the above formulation of the primer of the invention;

b. introducing the phenolic resin (B) and the rubber elastomer (C) into the organic solvent (A) and stirring at a speed of 100-300 rpm for 30-90 minutes at 10-30° C. to obtain a mixed solution;

c. adding the silane coupling agent (D) into the mixed solution and keeping stirring until a stable solution is formed;

d. adding the metal oxide powder (E) and the inorganic filler (F) into the stable solution and stirring at a speed of 500-700 rpm for 30-90 minutes to obtain a mixed slurry;

e. grinding the mixed slurry by a colloid mill until a fineness of the slurry is equal to or less than 5 μm so as to provide the primer.

The primer of the present invention can activate metal surfaces at a normal temperature and pressure so as to facilitate the adhesion of the metal and a rubber at the normal temperature and pressure. The 180 degree peel strength of the primer of the invention can be 8 N/mm or more when used in combination with an adhesive for adhering a metal material (such as a coal steel) with a rubber (such as a vulcanized rubber), which is comparable to the peel strength of the rubber bonded with the metal via the conventional vulcanization.

DETAILED DESCRIPTION OF THE INVENTION

The present invention will be further illustrated with the following embodiments which are disclosed for better understanding of the invention but not construed to limit the scope of the invention.

Unless otherwise indicated, "part(s)" used herein means "part(s) by weight"; and "%" means "wt %", i.e., weight percentage. The weight percentages used herein are based on the total weight of all the components of the primer of the invention, unless indicated otherwise.

"Rubber polymer" and "rubber elastomer" used herein have the same meaning and may be replaced with each other.

The "normal temperature" herein refers to a temperature of 10-30° C. and the "normal pressure" herein refers to about one atmospheric pressure.

The "primer" of the invention is not the same as typical bonder or adhesive in the art. The primer of the invention can mainly activate metal surfaces so as to improve adhesion strength of an adhesive. In this respect, the primer of the invention can be referred to as a metal surface treating agent, or a metal undercoat or a metal primer. The "primer" of the invention can be used for bonding metal and rubber under a normal temperature and pressure. In the invention, the metal includes, but is not limited to, steel, iron, aluminum, aluminum alloy, copper or the like. The rubber of the invention may be natural rubber and may also be synthetic rubber. It may include, but is not limited to natural rubber, styrene-butadiene rubber, cis-1,4-polybutadiene rubber, ethylene/propylene/diene terpolymer rubber, chloroprene rubber, or any mixtures thereof. During the process of applying the primer, an even and thin coating should be formed. After the volatilization of the organic solvent is completed, an adhesive may be further applied. The volatilization rate of the solvent may be mainly dependent on the nature of the solvent, the ambient temperature and the aeration conditions. For example, the organic solvent of a primer may be completely volatilized in about 20 minutes at 25° C. under a well-ventilated condition.

The primer of the invention is used for a metal surface, which comprises: 50-80 wt % of organic solvent (A), 2-15 wt % of phenolic resin (B), 1-10 wt % of rubber elastomer (C), 1-10 wt % of silane coupling agent (D); 5-25 wt % of metal oxide powder (E) and 1-10 wt % of inorganic filler (F). In the invention, the sum of the weight percentages of all the components is 100%. The organic solvent of the invention is an organic solvent capable of dissolving the phenolic resin (B) and the rubber elastomer (C). Preferably, the primer of the invention does not contain any curative or catalyst. So-called "not contain any curative or catalyst" herein means no curative or catalyst being specially added in the primer, but does not exclude a curative and/or a catalyst presenting in the primer as impurities. The species of the curative and catalyst are those well known in the art, and thus detailed description of them is omitted herein.

In the present invention, the primer may comprise 50-80%, preferably 55-75% and more preferably 60-70% of organic solvent (A). The organic solvent of the invention is capable of dissolving both phenolic resins and rubber elastomers. The organic solvent of the invention is preferably selected from solvents having lower boiling points so as to completely volatilized as fast as possible. Considering from the perspective of environmental protection, the organic solvent of the invention preferably has less toxicity. The organic solvent can be aromatic solvents, ketons, esters, alkanes or the like. In a preferred embodiment of the present invention, the organic solvent (A) may be selected from acetone, butanone, methyl isobutyl ketone, cyclohexanone, toluene, xylene, ethylbenzene and any mixtures thereof. More preferably, the organic solvent (A) may be methyl isobutyl ketone and/or xylene. Further preferably, the organic solvent (A) is a mixture of methyl isobutyl ketone and xylene. In the mixture of methyl isobutyl ketone and xylene, the weight ratio of methyl isobutyl ketone to xylene may be 40-60:6-15, preferably 45-55:8-12, more preferably 50-53:10-11. This preferred embodiment may improve the dissolution effect of phenolic resins and rubber elastomers so as to enhance the adhesion strength of the primer.

In the present invention, the primer may comprise 2-15%, preferably 3-13%, more preferably 5-10% of phenolic resin (B). The phenolic resin of the invention can dissolve in the organic solvent, which includes, but is not limited to resole, linear phenolic resin and modified phenolic resin. In a preferred embodiment of the present invention, the phenolic resin (B) may be selected from resole, linear phenolic resin, p-t-butylphenol formaldehyde resin, xylene modified phenolic resin, polyvinyl acetal modified phenolic resin, rubber modified phenolic resin, epoxide modified phenolic resin, polyamide modified phenolic resin and any mixtures thereof. More preferably, the phenolic resin (B) may be selected from p-t-butylphenol formaldehyde resin, xylene modified phenolic resin, epoxide modified phenolic resin and any mixtures thereof. Further preferably, the phenolic resin (B) may be p-t-butylphenol formaldehyde resin or epoxide modified phenolic resin.

In the present invention, the primer may comprise 1-10%, preferably 1.5-6%, more preferably 2-5% of rubber elastomer (C). In a preferred embodiment of the present invention, the rubber elastomer is a halogen-containing rubber elastomer. The halogen includes fluorine, chlorine, bromine and iodine. In the present invention, the rubber elastomer (C) may be selected from nitrile butadiene rubber, chlorinated natural rubber, chlorinated polybutadiene, chloro-sulfonated polyethylene, chlorinated polyethylene, polychloroprene and any mixtures thereof. Preferably, the rubber elastomer (C) of the invention may be selected from nitrile butadiene rubber, chlorinated natural rubber, chloro-sulfonated polyethylene and any mixtures thereof. More preferably, the rubber elastomer (C) of the invention may be nitrile butadiene rubber, chlorinated natural rubber or chloro-sulfonated polyethylene.

In the present invention, the primer may comprise 1-10%, preferably 1.8-8%, more preferably 2-3% of silane coupling agent (D). The silane coupling agent (D) of the invention is mainly used for the surface treatment. In a preferred embodiment of the present invention, the silane coupling agent (D) may be selected from vinyl-containing siloxane, amino-containing siloxane, epoxy group-containing siloxane, acyl-containing siloxane, mercapto group-containing siloxane, phenyl-containing siloxane and any mixtures thereof. More preferably, the silane coupling agent (D) of the invention may be selected from vinyl-containing siloxane, amino-containing siloxane, epoxy group-containing siloxane and any mixtures thereof. Further preferably, the silane coupling agent (D) of the invention is vinyl-containing siloxane or amino-containing siloxane. The examples of the silane coupling agent (D) of the invention may include: γ-chloropropyltrimethoxysilane, γ-chloropropyltriethoxysilane, γ-chloropropylmethyldimethoxysilane, bis-(γ-triethoxysilylpropyl)-tetrasulfide, γ-mercaptopropyltrimethoxysilane, γ-mercaptopropyltriethoxysilane, γ-aminopropyltriethoxysilane, γ-aminopropyltrimethoxysilane, N-(β-aminoethyl)-aminopropylmethyldimethoxysilane, N-(aminoethyl)-aminopropyltrimethoxysilane, γ-aminopropylmethyldiethoxysilane, γ-methylacryloxypropyltrimethoxysilane, 3-glycidoxypropyltrimethoxysilane, (heptadecafluoro-1,1,2,2-tetrahydrodecyl)trimethoxysilane, (heptadecafluoro-1,1,2,2-tetrahydrodecyl)trichlorosilane, methyltrimethoxysilane, vinyltriethoxysilane, vinyltrimethoxysilane, vinyl-tri(2-methoxyethoxy)-silane, vinyltrimethoxysilane oligomer.

In the present invention, the primer may comprise 5-25%, preferably 10-20%, more preferably 15-19% of metal oxide powder (E). The average particle size of the metal oxide powder (E) of the invention has no particular limitation. For example, it may be 1-1000 μm, preferably 2-10 μm, and more preferably 1-5 μm. Within the above ranges, time can be saved and the adhesion strength can be improved when grinding by a colloid mill. In the present invention, the metal oxide powder (E) may be selected from magnesium oxide, zinc oxide, titanium dioxide and any mixtures thereof. Preferably, the metal oxide powder (E) of the invention is a mixture of zinc oxide and titanium dioxide. In the mixture of zinc oxide and titanium dioxide, the weight ratio of zinc oxide to titanium dioxide may be 10-20:2-6, preferably 13-15:3-5.

In the present invention, the primer may comprise 1-10%, preferably 2-6% of inorganic filler (F). The inorganic filler (F) is different from the metal oxide powder (E). In the present invention, the inorganic filler (F) may be selected from silica, calcium carbonate, carbon black and any mixtures thereof. Preferably, the inorganic filler (F) of the invention is a mixture of silica and carbon black. In the mixture of silica and carbon black, the weight ratio of the silica to the carbon black may be 1:0.5-2, preferably 1:1-1.5.

The primer of the invention has excellent properties. The primer has a 180 degree (i.e.) 180° peel strength of 8-10 N/mm, preferably 8.5-9.5 N/mm determined according to GB/T2790-1995. In addition, the primer has a shear strength of 3-4 MPa (where the rubber material was destroyed), determined according to HG/T3659-1999. During measuring the shear strength of the primer of the invention, the vulcanized rubber material adhering on the metal was destroyed. In fact, the obtained value of the test is therefore the shear strength of the vulcanized rubber material. The actual shear strength of the primer of the invention should be larger than the result of the measurement.

The primer of the present invention can be prepared by the following steps: a. providing raw materials according to the formulation of the primer; b. dissolving the phenolic resin (B) and the rubber elastomer (C) into the organic solvent (A) to form a mixed solution; c. mixing the silane coupling agent (D) with the mixed solution to form a stable solution; d. mixing the metal oxide powder (E) and the inorganic filler (F) with the stable solution to form a mixed slurry; e. grinding the mixed slurry. In one embodiment of the present invention, the method comprises the following particular steps: a. providing raw materials according to the formulation of the primer; b. introducing the phenolic resin (B) and the rubber elastomer (C) into the organic solvent (A) and stirring at a speed of 100-300 rpm for 30-90 minutes at 10-30° C. to obtain a mixed solution; c. adding the silane coupling agent (D) into the mixed solution and keeping stirring until a stable solution is formed; d. adding the metal oxide powder (E) and the inorganic filler (F) into the stable solution and stirring at a speed of 500-700 rpm for 30-90 minutes to obtain a mixed slurry; e. grinding the mixed slurry by a colloid mill until a fineness of the slurry is equal to or less than 5 μm to provide the primer.

In the invention, step a may be performed as a separate step, that is, all the raw materials are provided in a single step; or may be a multiple-step performed separately before other steps, that is, right before the corresponding step, the corresponding raw material(s) is(are) provided.

In step b of the invention, the phenolic resin (B) and the rubber elastomer (C) are added into the organic solvent (A) in order that the phenolic resin (B) and the rubber elastomer (C) are dissolved thoroughly to form a mixed solution, which allows for a uniform mixing of the resin and the elastomer. The dissolution of the resin and the elastomer can be accelerated by stirring. The stirring temperature may be 10-30° C., preferably 15-20° C.; the stirring time may be 30-90 minutes, preferably 50-60 minutes; and the stirring speed may be 100-300 rpm, preferably 150-200 rpm.

In step c of the invention, the silane coupling agent (D) is added into the above obtained mixed solution and the solution is kept stirring until a stable mixture is formed. The stable solution is preferably homogeneous. In order to avoid reactions of the silane coupling agent (D), water should try to be avoided in the system. The dispersing of the silane coupling agent (D) can be accelerated by stirring. The stirring temperature may be 10-30° C., preferably 15-20° C.; the stirring time may be 30-90 minutes, preferably 50-60 minutes; and the stirring speed may be 100-300 rpm, preferably 150-200 rpm.

In step d of the invention, the metal oxide powder (E) and the inorganic filler (F) are added into the stable solution. The metal oxide powder (E) and the inorganic filler (F) may be added into the stable solution simultaneously or separately, and simultaneous addition is preferred. The evenly dispersed slurry can be obtained by stirring at a high speed. The stirring temperature may be 10-30° C., preferably 15-20° C.; the stirring time may be 30-90 minutes, preferably 50-60 minutes; and the stirring speed may be 500-700 rpm, preferably 550-650 rpm.

In step e of the present invention, the mixed slurry is ground by a colloid mill till the fineness of the slurry is equal to or less than 5 μm to provide the primer. When the colloid mill works, a rotor gear (which is also referred to as "rotor") driven by a motor via a belt rotates at a high speed relative to a matching stator gear (which is also referred to as "stator"), i.e., one rotates at a high speed and the other holds still. When the material to be treated passes through the gap between the rotor gear and stator gear under a downward spiral impact force from its own weight or from an external pressure (for example, from a pump), the material is subjected to physical actions such as strong shear force, friction force, high frequency vibration, high speed vortex and the like and thereby effectively emulsified, dispersed, homogenized and pulverized, so that the material is ultrafine ground and emulsified. The fineness may be controlled by adjusting the gap of the colloid mill. At present, the minimum fineness can be 0.1 μm. However, a smaller fineness needs a narrower gap and increased cycle times, which reduces the work efficiency. In a preferred embodiment of the present invention, the fineness of the primer of the invention is equal to or less than 5 μm, more preferably 0.001-5 μm, and further preferably 1-5 μm.

The primer of the invention is suitable for bonding metal and rubber under a normal temperature.

For example, it can be used for the pulley lagging under a normal temperature. Besides, the primer of the invention may also be used for bonding metal and rubber in manufacturing other mechanical devices or automobile accessories under a normal temperature. The primer of the invention may be used for bonding a vulcanized rubber on a metal, such as steel, iron, aluminum, aluminum alloy, copper or the like.

Hereinafter, the present invention will be illustrated in detail with the Examples which do not intend to limit the present invention.

The raw materials used in the Examples are listed below. If not specified otherwise, all of the raw materials are commercially available.

Adhesive: TS808FR, produced by TONSAN Adhesive Inc., TS808FR is a two-component bonder and can fast cure under normal temperature.

Vulcanized rubber sample: produced by Anhui Depreux Rubber Belt Co., Ltd.

The methods for measurement used herewith are described below.

1. Shear Strength

The shear strength was determined according to HGIT 3659-1999 (Polychloroprene rubber based adhesive for quick bonding conveyor belts). The samples were prepared according to the following steps and other steps were performed as recorded in the standard.

A. Sample Treatment

Five vulcanized rubber samples with the width of 25 mm, the length of 100 mm and the thickness of 5-8 mm were prepared. The surface to be bonded of each rubber sample was coarsened by a portable angle grinder (equipped with a tungsten steel grinding disc) and washed with toluene. Then, the samples were placed in a thermostatic drying oven at 60-80° C. for about 10 minutes and then cooled down naturally to room temperature.

Five carbon steel test plates with the width of 25 mm, the length of 100 mm and the thickness of 2-3 mm were prepared. The surface to be bonded of each plate was coarsened by a portable angle grinder (equipped with an abrasive disc) and washed with toluene. Then the test plates were placed in a thermostatic drying oven at 60-80° C. for about 10 minutes, and then cooled down naturally to room temperature.

B. Applying

The primer of the invention was shook to be even and applied with a brush on the treated surface of each carbon steel test plate for an area of 30 mm (longitudinal direction)× 25 mm (transversal direction), so as to form a primer-coated sample. The coating should be thin and uniform without any vacancy. Each primer-coated sample was dried for 30 minutes. The two components of the adhesive were mixed at a weight ratio of 10:1 and the mixture was applied respectively on the surfaces to be bonded of each carbon steel test plate and each vulcanized rubber sample twice with the interval of 20 minutes between the two applications. The coated carbon steel test plates and vulcanized rubber samples were exposed to the ambient for about 15 minutes.

C. Curing

The coated carbon steel test plate and vulcanized rubber sample were adhered together with the bonding length of (25±1) mm by striking several times with a rubber hammer, and cured at 25° C. for 24 hours.

2. Peel Strength

The 180 degree peel strength was determined according to GB/T 2790-1995 (Adhesive's 180° peel strength test method—flexible material vs rigid material). The samples were prepared according to the following steps and other steps were performed as recorded in the standard.

A. Sample Treatment

Five vulcanized rubber samples with the width of 25 mm, the length of 200 mm and the thickness of 5-8 mm were prepared. The surface to be bonded of each rubber sample was coarsened by a portable angle grinder (equipped with a tungsten steel grinding disc) and washed with toluene. Then, the samples were placed in a thermostatic drying oven at 60-80° C. for about 10 minutes and then cooled down naturally to room temperature.

Five carbon steel test plates with the width of 25 mm, the length of 350 mm and the thickness of 2-3 mm were prepared. The surface to be bonded of each plate was coarsened by a portable angle grinder (equipped with an abrasive disc) and washed with toluene. Then the test plates were placed in a thermostatic drying oven at 60-80° C. for about 10 minutes, and then cooled down naturally to room temperature.

B. Applying

The primer of the invention was shook to be even and applied with a brush on the treated surface of each carbon steel test plate for an area of 150 mm (longitudinal direction)×25 mm (transversal direction), so as to form a primer-coated sample. The coating should be thin and uniform without any vacancy. Each primer-coated sample was dried for 30 minutes. The two components of the adhesive were mixed at a weight ratio of 10:1 and the mixture was applied respectively on the surfaces to be bonded of each carbon steel test plate and each vulcanized rubber sample twice with the interval of 20 minutes between the two applications. The coated carbon steel test plates and vulcanized rubber samples were exposed to the ambient for about 15 minutes.

C. Curing

The coated carbon steel test plate and vulcanized rubber sample were adhered together with the bonding length of 150 μm by striking several times with a rubber hammer, and cured at 25° C. for 24 hours.

3. Fineness

The fineness was determined according to GB/T 6753.1-2007 (Paints, varnishes and printing inks—Determination of fineness of grind). The main steps are as follows and other steps refer to the standard.

(1) A sample having the viscosity accord with the product standard was stirred thoroughly with a spatula. Then, several droplets of the sample were taken out and dropped into the deepest position of the groove, i.e., the position representing the maximum scale value.
(2) A blade held by both hands was placed transversely on the position representing the maximum scale value (on the edge of the sample) such that the blade vertically contacted the surface of the scraper. Within 3 seconds, the blade was hauled from the position representing the maximum scale value towards the position representing the minimum scale value.
(3) Immediately (no more than 5 seconds), with the sightline of the observer across with the surface of the groove at an angel of 15°-30°, the scale value of the position where the particles were evenly exposed in the groove when observed under light, was recorded, which was the fineness of the sample.

EXAMPLE 1

To a reaction vessel were added 70 g of methyl isobutyl ketone (MIBK), 5 g of tert-butyl phenolic resin (2402, Shanghai Xinhua Resin Manufacturing Co.) and 2 g of chloro-sulfonated polyethylene (CSM30, PetroChina Jilin Petrochemical Company) and stirred with the speed of 200 rpm at 25° C. for 30 minutes to be completely dissolved. Then, 2 g of methyltrimethoxysilane (Nanjing Shuguang Chemical Group Co., Ltd.) was added in the reaction vessel and further stirred until the system was even. The mixture of 15 g of titanium dioxide, 3 g of silica and 3 g of carbon black was added in the reaction vessel and dispersed homogenously by stirring at a high speed of 550 rpm for 90 minutes. Finally, the resulting mixture was ground by a colloid mill to a fineness ≤5 μm. The product was discharged to obtain a primer. The primer was used in combination with the adhesive to bond a coarsened vulcanized rubber sample with a coarsened carbon steel plate under the normal temperature and pressure. Upon tests, the shear strength was 3.19 MPa (the rubber sample was destroyed) and the 180 degree peel strength was 8.9 N/mm.

EXAMPLE 2

To a reaction vessel were added a solvent mixture of 50 g of methyl isobutyl ketone (MIBK) and 10 g of xylene, 10 g of epoxide-modified phenolic resin (T6000, America Si Group Company) and 2 g of chlorinated natural rubber (R5-300, Xiangshui Ruize Chemical Co. Ltd.) and stirred with the speed of 200 rpm at 25° C. for 60 minutes to be completely dissolved. Then, 3 g of 3-glycidyloxypropyltrimethoxysilane (Nanjing Shuguang Chemical Group Co., Ltd.) was added in the reaction vessel and further stirred until the system was even. The mixture of 15 g of titanium dioxide, 4 g of zinc oxide, 3 g of silica and 3 g of carbon black were added in the reaction vessel and dispersed homogenously by stirring at a high speed of 600 rpm for 60 minutes. Finally, the resulting mixture was ground by a colloid mill to a fineness ≤5 μm. The product was discharged to obtain a primer.

The primer was used in combination with the adhesive to bond a coarsened vulcanized rubber sample with a coarsened carbon steel plate under the normal temperature and normal pressure. Upon tests, the shear strength was 3.26 MPa (the rubber sample was destroyed) and the 180 degree peel strength was 9.2 N/mm.

EXAMPLE 3

To a reaction vessel were added 70 g of acetone and 6 g of xylene phenolic resin (2602, Li Yang Winbond Polymer Material Co., Ltd.) and 2 g of nitrile butadiene rubber (N21, ZEON) and stirred with the speed of 250 rpm at 25° C. for 60 minutes to be completely dissolved. Then, 2 g of γ-aminopropyltriethoxysilane (Nanjing Shuguang Chemical Group Co., Ltd.) was added in the reaction vessel and further stirred until the system was even. Then a mixture of 15 g of titanium dioxide, 3 g of zinc oxide and 2 g of carbon black were added in the reaction vessel and dispersed homogenously by stirring at a high speed of 600 rpm for 60 minutes. Finally, the resulting mixture was ground by a colloid mill to a fineness ≤5 μm. The product was discharged from the mill to obtain a primer.

The primer was used in combination with the adhesive so as to bond a coarsened vulcanized rubber sample with a coarsened carbon steel plate under the normal temperature and normal pressure. Upon tests, the shear strength was 3.39 MPa (the rubber sample was destroyed) and the 180 degree peel strength was 8.5 N/mm.

COMPARATIVE EXAMPLE 1

Without applying the primer of the invention, only the adhesive was used for preparing the samples for the 180 degree peel strength test. The test result of 180 degree peel strength was only 4.1 N/mm.

The invention claimed is:
1. A primer for metal surfaces comprising:
organic solvent (A) 50-80 wt %;
phenolic resin (B) 2-15 wt %;
rubber elastomer (C) 1-10 wt %;
silane coupling agent (D) 1-10 wt %;

metal oxide powder (E) 5-25 wt %; and
inorganic filler (F) 1-10 wt %;
wherein the organic solvent (A) is an organic solvent capable of dissolving the phenolic resin (B) and the rubber elastomer (C), and the inorganic filler (F) is different from the metal oxide powder (E); and
wherein the metal oxide powder (E) comprises a mixture of zinc oxide and titanium dioxide in a weight ratio of from 10:2 to 20:6.

2. The primer according to claim 1, wherein the primer comprises no curative or catalyst.

3. The primer according to claim 1, wherein the phenolic resin (B) is selected from the group consisting of resole, linear phenolic resin, p-t-butylphenol formaldehyde resin, xylene modified phenolic resin, polyvinyl acetal modified phenolic resin, rubber modified phenolic resin, epoxide modified phenolic resin, polyamide modified phenolic resin and mixtures thereof.

4. The primer according to claim 1, wherein the rubber elastomer (C) is selected from the group consisting of nitrile butadiene rubber, chlorinated natural rubber, chlorinated polybutadiene, chloro-sulfonated polyethylene, chlorinated polyethylene, polychloroprene and mixtures thereof.

5. The primer according to claim 1, wherein the silane coupling agent (D) is selected from the group consisting of vinyl-containing siloxane, amino-containing siloxane, epoxy group-containing siloxane, acyl-containing siloxane, mercapto group-containing siloxane, phenyl-containing siloxane and mixtures thereof.

6. The primer according to claim 1, wherein the inorganic filler (F) is selected from the group consisting of silica, calcium carbonate, carbon black and mixtures thereof.

7. The primer according to claim 1, wherein the organic solvent (A) is selected from the group consisting of acetone, butanone, methyl isobutyl ketone, cyclohexanone, toluene, xylene, ethylbenzene and mixtures thereof.

8. The primer according to claim 7, wherein the organic solvent (A) is a mixture of methyl isobutyl ketone and xylene.

9. The primer according to claim 8, wherein the weight ratio of methyl isobutyl ketone to xylene is from 40:6 to 60:15.

10. The primer according to claim 1, wherein the primer has a 180 degree peel strength of 8-10 N/mm determined according to GB/T2790-1995.

11. A method for preparing a primer for metal surfaces, the method comprising:
a. providing raw materials according to the formulation of the primer for metal surfaces according to claim 1;
b. dissolving the phenolic resin (B) and the rubber elastomer (C) into the organic solvent (A) to form a mixed solution;
c. mixing the silane coupling agent (D) with the mixed solution to form a stable solution;
d. mixing the metal oxide powder (E) and the inorganic filler (F) with the stable solution to form a mixed slurry; and
e. grinding the mixed slurry.

12. A method for preparing a primer for metal surfaces, the method comprising:
a. providing raw materials according to the formulation of the primer for metal surfaces according to claim 1;
b. introducing the phenolic resin (B) and the rubber elastomer (C) into the organic solvent (A) and stirring at a speed of 100-300 rpm for 30-90 minutes at 10-30° C. to obtain a mixed solution;
c. adding the silane coupling agent (D) into the mixed solution and stirring until a stable solution is formed;
d. adding the metal oxide powder (E) and the inorganic filler (F) into the stable solution and stirring at a speed of 500-700 rpm for 30-90 minutes to obtain a mixed slurry; and
e. grinding the mixed slurry by a colloid mill until a fineness of the slurry is equal to or less than 5 μm so as to provide the primer for metal surfaces.

13. The primer according to claim 1, wherein the primer comprises:
organic solvent (A) 60-70 wt %;
phenolic resin (B) 5-10 wt %;
rubber elastomer (C) 2-5 wt %;
silane coupling agent (D) 2-3 wt %;
metal oxide powder (E) 15-19 wt %; and
inorganic filler (F) 2-6 wt %.

* * * * *